United States Patent
Kim

(10) Patent No.: US 9,739,006 B2
(45) Date of Patent: Aug. 22, 2017

(54) WASHING MACHINE AND MANUFACTURING METHOD OF DOOR

(71) Applicant: SAMSUNG ELECTRONICS CO., LTD., Suwon-si, Gyeonggi-do (KR)

(72) Inventor: Hyeon Cheol Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 207 days.

(21) Appl. No.: 14/479,397

(22) Filed: Sep. 8, 2014

(65) Prior Publication Data
US 2015/0069889 A1 Mar. 12, 2015

(30) Foreign Application Priority Data
Sep. 11, 2013 (KR) ........................ 10-2013-0109251

(51) Int. Cl.
| | | |
|---|---|---|
| *D06F 39/14* | (2006.01) | |
| *B32B 27/08* | (2006.01) | |
| *D06F 39/12* | (2006.01) | |
| *B32B 27/30* | (2006.01) | |
| *B32B 27/36* | (2006.01) | |

(Continued)

(52) U.S. Cl.
CPC .............. *D06F 39/14* (2013.01); *B32B 27/08* (2013.01); *B32B 27/302* (2013.01); *B32B 27/308* (2013.01); *B32B 27/365* (2013.01); *D06F 39/12* (2013.01); *B29C 65/58* (2013.01); *B29C 66/543* (2013.01); *B29C 66/545* (2013.01); *B29C 66/71* (2013.01); *B29C 66/712* (2013.01); *B29C 66/73361* (2013.01); *B29C 66/73365* (2013.01); *B29L 2031/724* (2013.01); *B29L 2031/7406* (2013.01); *B29L 2031/762* (2013.01); *B32B 2307/41* (2013.01); *B32B 2307/412* (2013.01)

(58) Field of Classification Search
None
See application file for complete search history.

(56) References Cited

U.S. PATENT DOCUMENTS

| | | | | |
|---|---|---|---|---|
| 2004/0020246 A1* | 2/2004 | Yun | ........................ | D06F 39/14 68/24 |
| 2005/0262681 A1* | 12/2005 | Yoon | ...................... | D06F 39/14 29/428 |

(Continued)

FOREIGN PATENT DOCUMENTS

| | | |
|---|---|---|
| CN | 1475621 | 2/2004 |
| CN | 1880562 | 12/2006 |

(Continued)

OTHER PUBLICATIONS

Espacenet English Abstract of Japanese Publication No. 2005-517477, Published Jun. 16, 2005.

(Continued)

*Primary Examiner* — Michael Barr
*Assistant Examiner* — Cristi Tate-Sims
(74) *Attorney, Agent, or Firm* — Staas & Halsey LLP

(57) ABSTRACT

A washing machine including a door to open and close an opening for laundry. The door includes a first upper door, a second upper door disposed to allow at least one portion of the first upper door to be seen therethrough, and a lower door. The lower door includes a contraction preventing part to prevent the lower door from contracting when molded.

12 Claims, 8 Drawing Sheets

(51) Int. Cl.
  *B29L 31/00* (2006.01)
  *B29C 65/58* (2006.01)
  *B29C 65/00* (2006.01)

(56) References Cited

U.S. PATENT DOCUMENTS

| | | | | |
|---|---|---|---|---|
| 2006/0053842 A1* | 3/2006 | Je | ............................ | D06F 39/14 68/17 R |
| 2006/0090523 A1 | 5/2006 | Lyu | | |
| 2006/0254323 A1 | 11/2006 | Kim | | |
| 2011/0050060 A1* | 3/2011 | Kim | ........................ | D06F 23/04 312/228 |
| 2013/0002113 A1* | 1/2013 | Loss | ........................ | D06F 37/28 312/291 |

FOREIGN PATENT DOCUMENTS

| CN | 101532235 | 9/2009 |
|---|---|---|
| CN | 101671930 | 3/2010 |
| CN | 202559124 | 11/2012 |
| JP | 2005-517477 | 6/2005 |
| WO | 2009/113808 A2 | 9/2009 |

OTHER PUBLICATIONS

PCT International Search Report dated Dec. 24, 2014 in corresponding International Patent Application No. PCT/KR2014/008409.
Office Action for Chinese Patent Application No. 201480048385.7, issued Mar. 13, 2017.
Espacenet English Language Abstract for CN 202559124, published Nov. 28, 2012.
Espacenet English Language Abstract for CN 101671930, published Mar. 17, 2010.
Espacenet English Language Abstract for CN 1880562, published Dec. 20, 2006.
Espacenet English Language Abstract for CN 101532235, published Sep. 16, 2009.
Espacenet English Language Abstract for CN 1475621, published Feb. 18, 2004.

* cited by examiner

WASHING MACHINE AND MANUFACTURING METHOD OF DOOR

CROSS-REFERENCE TO RELATED APPLICATIONS

This application claims the benefit of Korean Patent Application No. 10-2013-0109251, filed on Sep. 11, 2013 in the Korean Intellectual Property Office, the disclosure of which is incorporated herein by reference.

BACKGROUND

1. Field

Embodiments of the present invention relate to a washing machine having a door with an improved outer structure and a manufacturing method of the door.

2. Description of the Related Art

A washing machine is an apparatus that washes laundry using electric power. Washing machines are generally classified into pulsator-type washing machines and drum-type washing machines according to how washing is performed. A pulsator-type washing machine includes a cabinet provided with a top opening to insert and remove laundry, a tub provided in the cabinet to store wash water, a rotational tub rotatably provided in the tub, a motor to rotate the rotational tub, and a door to open and close the top opening.

Recently, decoration has been added to the door to provide an elegant design and distinguish the door from the cabinet. In conventional cases, decoration was implemented through a post processing such as color spray, chromium plating and bonding. Such post processing operations produce waste water and pollutants and are therefore hardly eco-friendly and raise manufacturing costs.

SUMMARY

Therefore, it is an aspect of the present invention to provide a more eco-friendly washing machine having a door presenting and maintaining a metallic color and a manufacturing method of the door.

Additional aspects of the invention will be set forth in part in the description which follows and, in part, will be obvious from the description, or may be learned by practice of the invention.

In accordance with one aspect of the present invention, a washing machine includes a cabinet forming an external appearance of the washing machine and having an opening for laundry, a tub provided in the cabinet to store wash water, a rotary tub rotatably provided in the tub, and a door to open and close the opening, wherein the door includes a first upper door, a second upper door disposed at an upper portion of the first upper door and formed of a light transmissive material, the second door including a first section coupled to the first upper door to allow the first upper door to be projected therethrough and a second section arranged not to be coupled to the first upper door, and a lower door disposed at a lower portion of the first upper door, the lower door including a part inclined to correspond to an interior of the second section and a lower surface defining a shape of a lower portion of the door, wherein the lower door includes a contraction preventing part formed on a surface adjacent to the inclined part to maintain inclination of the inclined part.

The lower door may further include an inclined flange disposed inside the second section, wherein the inclined part may be provided on an outer surface of the inclined flange.

The lower surface may include a flange lower surface defining a lower portion of the inclined flange, wherein the contraction preventing part may be provided on the flange lower surface.

The contraction preventing part may be recessed more than the flange lower surface to reduce any difference in thickness between the inclined flange and the lower door adjacent to the inclined flange.

The lower door may further include a lower door body disposed under the first upper door, wherein the inclined flange may be formed along a periphery of the lower door body and is thicker than the lower door body.

The door may include an insertion groove formed between the second section and the first upper door to allow the inclined flange to be inserted thereinto.

The lower surface may include a flange lower surface defining an orthogonal projection of the inclined part, wherein the contraction preventing part may be formed on the flange lower surface.

The contraction preventing part may be recessed more than the flange lower surface.

The inclined part may be exposed outward through the second section.

The inclined part may be inclined downward from an upper portion of the lower door with respect to a direction extending from a center of the lower door toward an outer edge of the lower door.

The first upper door may be formed of an opaque material.

At least one portion of the second upper door may be formed of a transparent material.

The second upper door may include an inner inclined surface formed at an interior of the second section to correspond to the inclined part, the inner inclined surface being inclined downward from an upper portion of the second upper door with respect to a direction extending from a center of the second upper door toward an outer edge of the second upper door.

The inclined part may form an acute angle with the flange lower surface.

The inclined part forms about 67 degrees with the flange lower surface.

The first upper door may be integrated with the second upper door through double injection molding.

The inclined part may externally present a metallic color due to scattering of light in the second section.

In accordance with another aspect of the present invention, a washing machine includes a cabinet forming an external appearance of the washing machine and having an an opening for laundry, a tub provided in the cabinet to store wash water, a rotary tub provided in the tub to accommodate the laundry, and a door to open and close the opening, wherein the door includes a first upper door, a second upper door arranged at an exterior of the first upper door and integrated with the first upper door through double injection molding and having at least one portion formed of a light transmissive material, the second door including a first section integrated with the first upper door and a second section formed around the first section, a lower door formed through injection molding and coupled to an interior of the first upper door and the second upper door, wherein the lower door includes an inclined flange coupled to an interior of the second section, and a contraction preventing part arranged along the inclined flange to prevent contraction of the inclined flange when the lower door is formed through the injection molding.

The inclined flange may include a flange lower surface formed at a lower portion of the inclined flange, and an inclined part bent from the flange lower surface and forming a certain angle with the flange lower surface to face the second section, wherein the contraction preventing part arranged along the flange lower surface to prevent contraction of the inclined part when the lower door is formed through the injection molding.

The contraction preventing part may be recessed more than the flange lower surface.

The inclined part may be exposed outward through the second section.

The inclined part may be inclined inward of the lower door with respect to a direction extending from a center of the lower door toward an outer edge of the lower door.

The lower door may be formed through injection molding, separately from the first upper door and the second upper door.

In accordance with another aspect of the present invention, a method of manufacturing a door to open and close an opening for laundry of a washing machine includes forming an upper door through double injection molding, the upper door including an outer upper door having a first section and a second section formed around the first section and formed of a transparent material allowing light to be transmitted therethrough and an inner upper door of an opaque material disposed inside the first section of the outer upper door and having at least one portion projected through the outer upper door, providing a lower door including an inclined part formed along a periphery of the lower door to have a certain angle and a contraction preventing part formed at a lower portion of the inclined part to maintain an inclined surface of the inclined part, coupling the lower door to the upper door such that the inclined part corresponds to an interior of the second section.

The interior of the second section may be provided with an inner surface inclined downward from an upper portion of the outer upper door with respect to a direction extending from a center of the outer upper door toward an outer edge of the outer upper door to correspond to the inclined part.

The lower door may include a lower surface defining a shape of a lower portion of the door, wherein the lower surface includes a flange lower surface defining an orthogonal projection of the inclined part, wherein the contraction preventing part may be formed on the flange lower surface.

The contraction preventing part may be concavely formed on the flange lower surface.

In accordance with a further aspect of the present invention, a washing machine includes a cabinet forming an external appearance of the washing machine and having an opening for laundry, a tub provided in the cabinet to store wash water, a rotary tub rotatably provided in the tub, and a door to open and close the opening, wherein the door includes a first upper door formed of an opaque material, a second upper door arranged at an exterior of the first upper door and having at least one portion formed of a transparent material allowing light to be transmitted therethrough, the second door including a first section coupled to the first upper door to allow the opaque material of the first upper door to be projected therethrough and a second section arranged not to be coupled to the first upper door, and a lower door including an inclined part arranged to adjoin an interior of the second section at an angle and a lower surface defining a shape of a lower portion of the door, the lower door being coupled to an interior of the first upper door, wherein the lower door includes a contraction preventing part formed on the lower surface to prevent contraction of the inclined part when the lower door is formed through injection molding.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
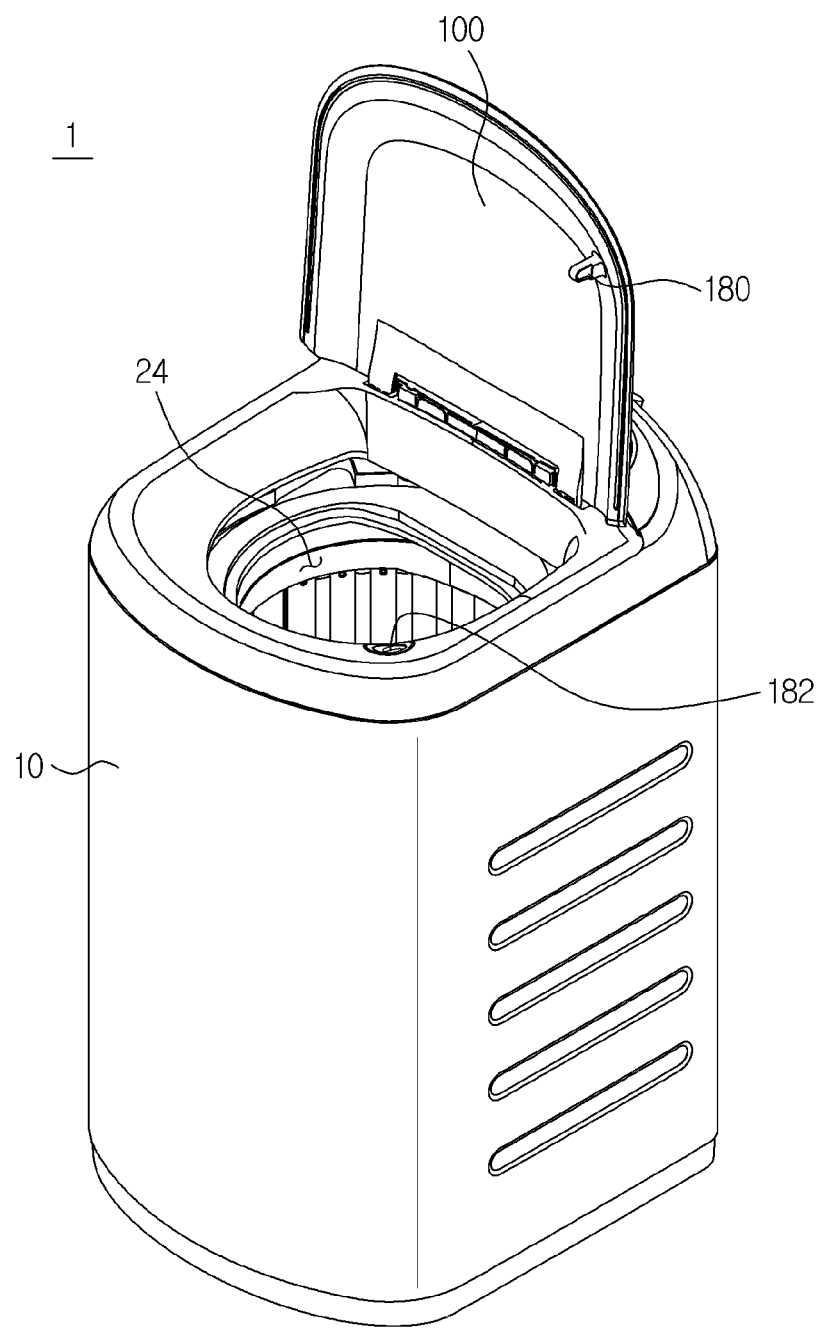
FIG. 1 is a view illustrating a washing machine according to one embodiment of the present invention.

Reference will now be made in detail to the embodiments of the present invention, examples of which are illustrated in the accompanying drawings, wherein like reference numerals refer to like elements throughout.

Figure 2:
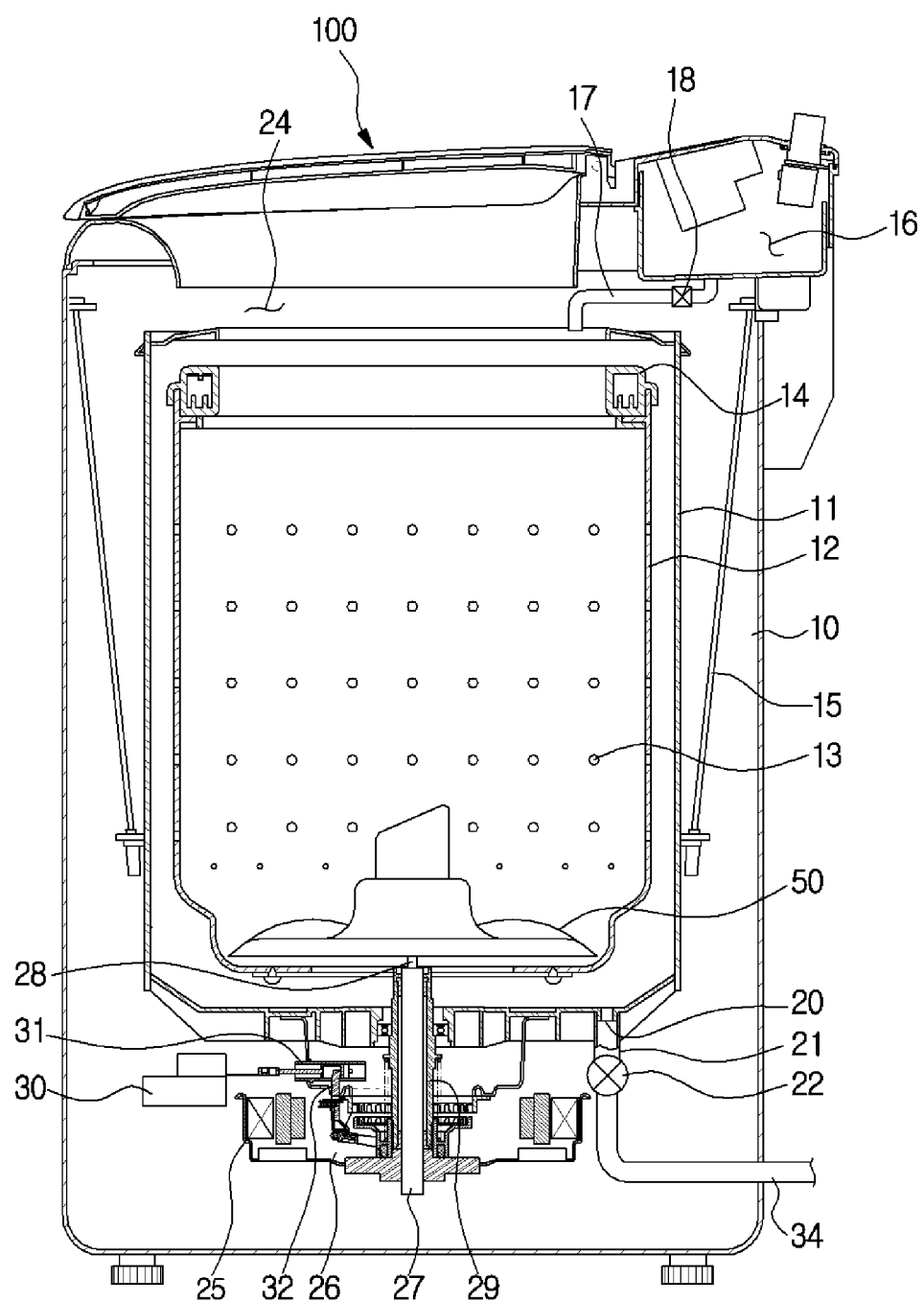
FIG. 2 is a cross-sectional view illustrating a washing machine according to one embodiment of the present invention.

FIG. 1 is a view illustrating a washing machine according to one embodiment of the present invention, and FIG. 2 is a cross-sectional view illustrating a washing machine according to one embodiment of the present invention.

As shown in FIGS. 1 and 2, a washing machine 1 includes a cabinet 10 forming an external appearance of the washing machine 1, a relatively fixed tub 11 disposed in the cabinet 10 to store water, a rotational tub 12 rotatably disposed in the fixed tub 11, and a pulsator 50 disposed in the rotational tub 12 to produce water current.

The upper portion of the cabinet 10 is provided with an opening 24 allowing laundry to be introduced into and taken out of the rotational tub 12 therethrough. The opening 24 may be opened or closed by a door 100 installed at the upper portion of the cabinet 10. The tub 11 may be supported on the cabinet 10 by a suspension 15.

A water supply pipe 17 to supply wash water to the fixed tub 11 is installed at the upper portion of the fixed tub 11. One side of the water supply pipe 17 is connected to an external water source, and the other side of the water supply pipe 17 is connected to a detergent feed unit 16. Water supplied through the water supply pipe 17 passes through the detergent feed unit 16 and thus water and a detergent are supplied into the fixed tub 11 together. A water supply valve 18 may be installed in the water supply pipe 17 to control supply of water.

The rotational tub 12 is formed in the shape of a cylinder having an open top, and multiple spin-dry holes 13 are formed on the lateral surface of the rotational tub 12. A balancer 14 may be mounted to the upper portion of the rotational tub 12 to ensure stable rotation of the rotational tub 12 when the rotational tub 12 rotates at a high speed.

Installed at the exterior of the lower portion of the fixed tub 11 are a motor 25 to generate driving force to rotate the rotational tub 12 and the pulsator 50, and a power conversion unit 26 to simultaneously or selectively transfer the driving force generated by the motor 25 to the rotational tub 12 and the pulsator 50.

A hollow spin-dry shaft 29 may be coupled to the rotational tub 12, and a washing shaft 27, which is installed at the hollow portion of the hollow spin-dry shaft 29, may be coupled to the pulsator 50 through a washing shaft coupling part 28. The motor 25 may simultaneously or selectively transfer the driving force to the rotational tub 12 and the pulsator 50 according to the elevating operation of the power conversion unit 26.

The power conversion unit 26 may include an actuator 30 to generate driving force for power conversion, a rod 31 to rectilinearly move according to operation of the actuator 30, and a clutch 32 connected to the rod 31 to rotate according to operation of the rod 31.

A drainage port 20 to discharge wash water stored in the rotational tub 12 may be formed at the bottom of the rotational tub 12, and a first drainage pipe 21 is connected to the drainage port 20. A drainage valve 22 to regulate drainage may be installed at the first drainage pipe 21. The outlet of the drainage valve 22 may be connected to a second drainage pipe 34 to discharge the wash water to an outside.

Figure 3:
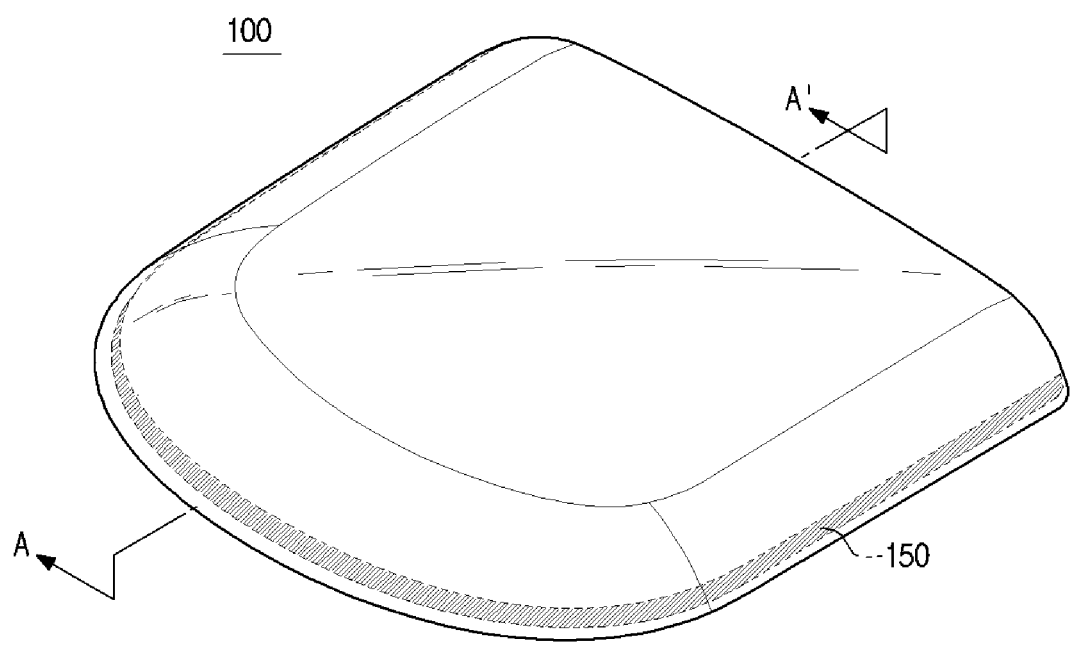
FIG. 3 is a perspective view illustrating a door of a washing machine according to one embodiment of the present invention.
Figure 4:
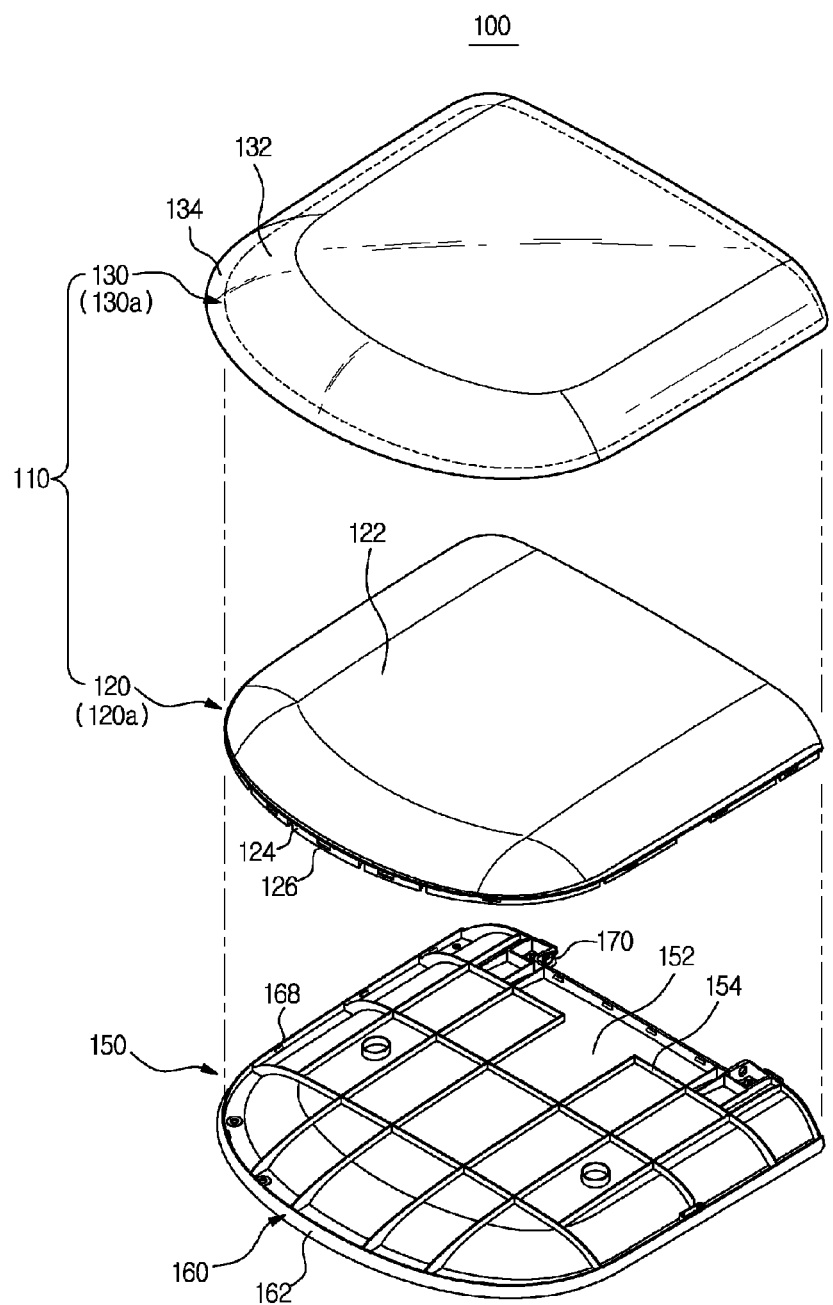
FIG. 4 is an exploded perspective view illustrating a door of a washing machine according to one embodiment of the present invention.
Figure 5:
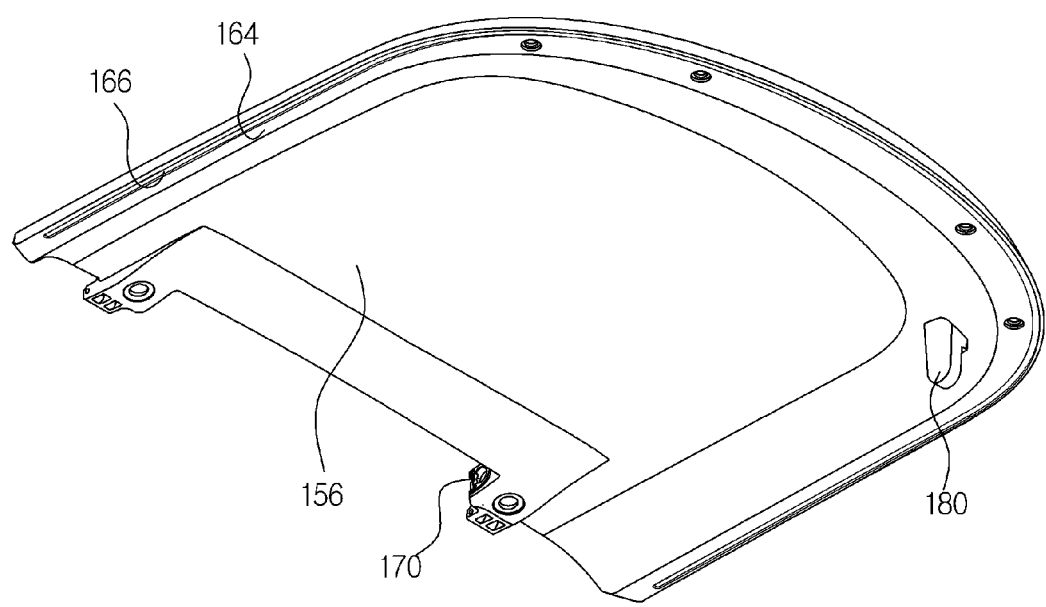
FIG. 5 is a bottom perspective view illustrating a door of a washing machine according to one embodiment of the present invention.

FIG. 3 is a perspective view illustrating a door of a washing machine according to one embodiment of the present invention, FIG. 4 is an exploded perspective view illustrating a door of a washing machine according to one embodiment of the present invention, and FIG. 5 is a bottom perspective view illustrating a door of a washing machine according to one embodiment of the present invention.

The door 100 is adapted to open and close the opening 24 of the cabinet 10. The shape of the door 100 is not limited.

The door 100 may include an upper door 110 and a lower door 150. The upper door 110 is coupled with the lower door 150. The upper door 110 defines the shape of the upper portion of the door 100, and the lower door 150 defines the shape of the lower portion of the door 100.

The upper door 110 may include a first upper door 120 and a second upper door 130.

The first upper door 120 may be formed of an opaque material.

The second upper door 130 may be disposed at the exterior of the first upper door 120 and formed of a material allowing light to be transmitted therethrough. The second upper door 130 may be arranged on the first upper door 120, and the lower door 150, which will be described below, may be arranged under the first upper door 120.

The second upper door 130 may be formed of a transparent material. At least one portion of the second upper door 130 may be formed of a transparent material to allow the first upper door 120 to be seen therethrough. That is, the first upper door 120 may be seen from the outside of the door 100 through the second upper door 130.

The second upper door 130 may include a first section 132 coupled to the first upper door 120 and a second section 134 which is not coupled to the first upper door 120. Disposition of the first section 132 and the second section 134 is not limited. In this embodiment, the second section 134 is disposed along the periphery of the first section 132. That is, the first upper door 120 is disposed inside the second upper door 130 such that the first upper door is covered by the second upper door 130.

Disposition or formation of a transparent material for the second upper door 130 is not limited. In this embodiment, the first upper door 120 exposed through the first section 132, and at least one portion of the lower door 150, which will be described below, may be exposed through the second section 134.

The first upper door 120 and the second upper door 130 may be manufactured in various ways. In this embodiment, the first upper door 120 and the second upper door 130 may be integrated with each other through double injection molding. That is, the first upper door 120 may be integrated with the first section 132 of the second upper door 130 to maintain smoothness of the surface without employing a separating coupling constituent.

According to one embodiment, the second upper door 130 is formed first through injection molding, and then the first upper door 120 is formed through injection molding. It may also be possible to form the first upper door 120 first through injection molding and then form the second upper door 130 through injection molding.

The lower door 150 is coupled to the lower portion of the upper door 110.

The lower door 150 may include a lower door body 152 defining the shape of the lower portion of the door 100 and an inclined flange 160.

The lower door body 152 is provided with a reinforcement flange 154 disposed between the upper door 110 and the lower door 150 to serve to enhance durability of the door 100. The reinforcement flange 154 may be disposed in the shape of a mesh or a honeycomb. In this embodiment, the reinforcement flange 154 is disposed in the shape of a mesh to enhance durability.

The inclined flange 160 is formed along the periphery of the lower door body 152 and may be disposed between the first upper door 120 and the second upper door 130. Specifically, when the upper door 110 is coupled to the lower door 150, the inclined flange 160 may be disposed inside the second section 134.

The door 100 is provided with a hinge 170 to be rotatably arranged in the cabinet 10. In this embodiment, the hinge 170 is arranged at the back of the lower door 150. Thereby, the inclined flange 160 is arranged on the front and the sides of the lower door 150 but not at the back of the lower door 150. However, disposition of the inclined flange 160 is not limited thereto.

The inclined flange 160 may be provided with a coupling protrusion 168 to be coupled to the inclined flange 160. The coupling protrusion 168 may correspond to a coupling groove 126 provided to the first upper door 120. Specifically, the coupling groove 126 may be formed inside the first upper door 120 such that the coupling portions of the upper door 110 and the lower door 150 are not exposed when the upper door 110 and the lower door 150 are coupled to each other. In this embodiment, the coupling protrusion 168 is provided to the lower door body 152, and the coupling groove 126 is provided to the upper door 110. However, it is also possible to provide the coupling protrusion 168 to the upper door 110 and provide the coupling groove 126 to the lower door body 152.

According to one embodiment of the present invention, the second upper door 130 may be formed of a transparent material, and the first upper door 120 may be formed of an opaque material. Particularly, the first upper door 120 may be formed of a colored opaque material. For example, the second upper door 130 may be formed of at least one of plastic materials such as polymethyl metacrylate (PMMA) and polycrbonate (PC). The first upper door 120 may be formed of acrylonitrile butadiene styrene copolymer (ABS). The lower door 150 may also be formed of ABS.

The lower door 150 may further include a lower surface 156 formed at the lower portion thereof to define the shape of the lower portion of the door 100.

The lower door 150 may further include an opening/closing protrusion 180 provided to the lower portion of the lower door 150 such that the opening/closing protrusion 180 is fixed to the cabinet 10 when the door 100 closes the opening 24. The opening/closing protrusion 180 corresponds to an opening/closing groove 182 arranged adjacent to the opening 24, and maintains the closed state of the door 100 when the opening/closing protrusion 180 is inserted into the opening/closing groove 182.

Figure 6:
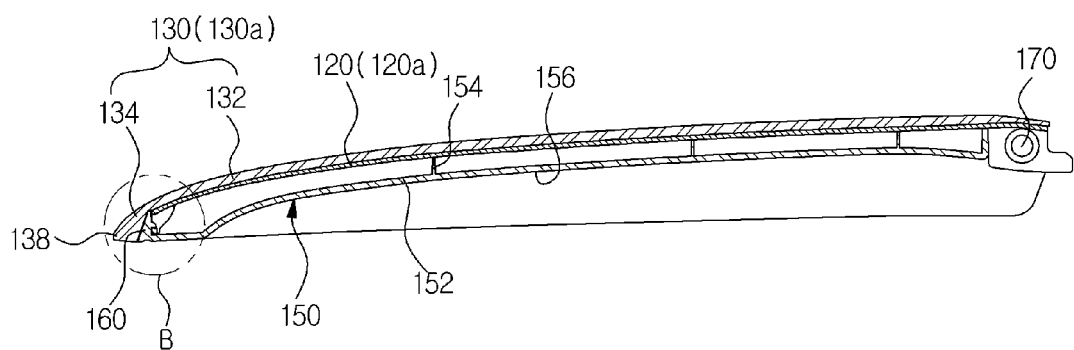
FIG. 6 is a cross-sectional view taken along line A-A' of FIG. 3.

FIG. 6 is a cross-sectional view taken along line A-A' of FIG. 3.

As shown in FIG. 6, the upper door 110 and the lower door 150 are coupled by engaging each other. The second upper door 130 is formed of a transparent material. The second upper door 130 includes the first section 132 coupled to the first upper door 120 such that the first upper door 120 can be seen therethrough, and the second section 134 arranged around and extending from the first section 132.

The upper door 110 has a wider area than the lower door 150, and is arranged to cover the lower door 150. The upper door 110 may define the shape of the top surface of the door 100 such that the hinge 170 of the lower door 150 and the reinforcement flange 154 of the lower door body 152 are not exposed outward.

The second section 134 of the second upper door 130 allows an inclined part 162 to be exposed outward. The front of the second section 134 may be provided with a handle 138 adapted to protrude forward of the cabinet 10 when the door 100 closes the opening 24.

Figure 7:
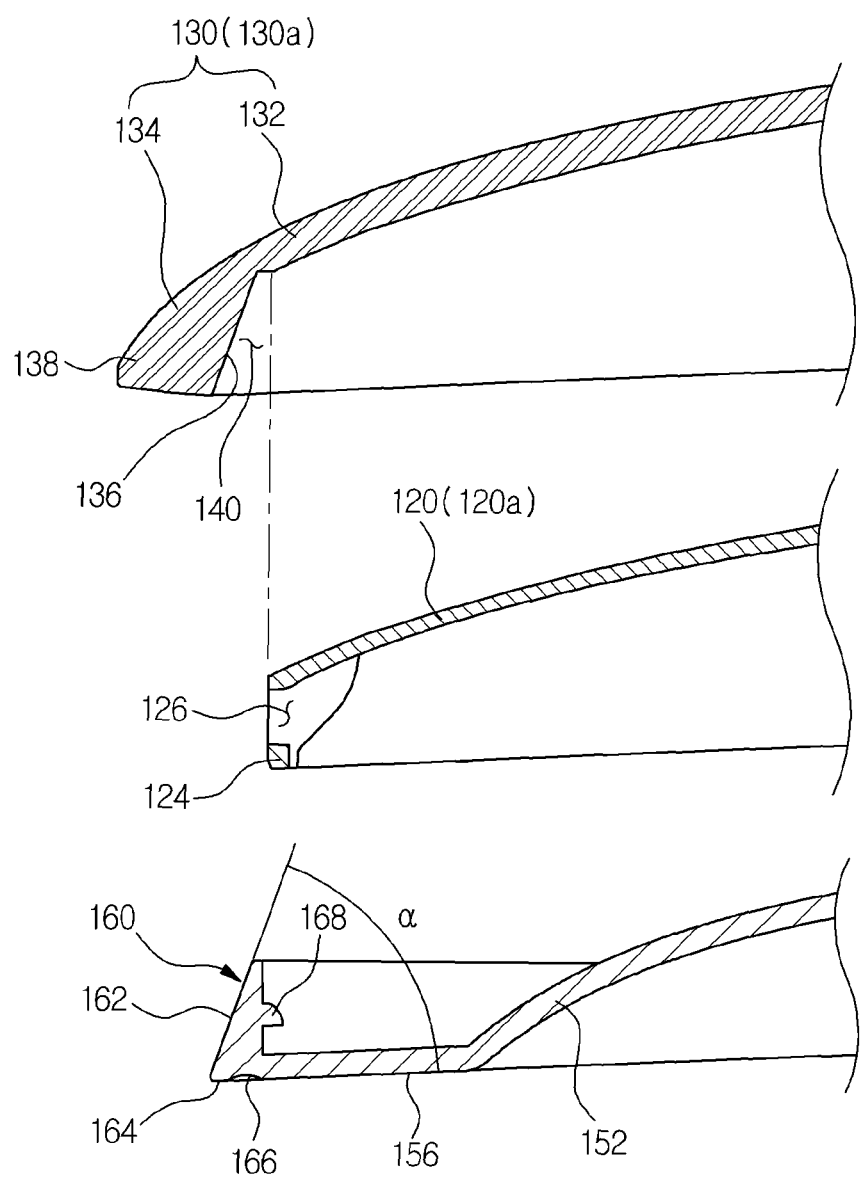
FIG. 7 is a view illustrating coupling of parts of the door of a washing machine in section B shown in FIG. 6.
Figure 8:
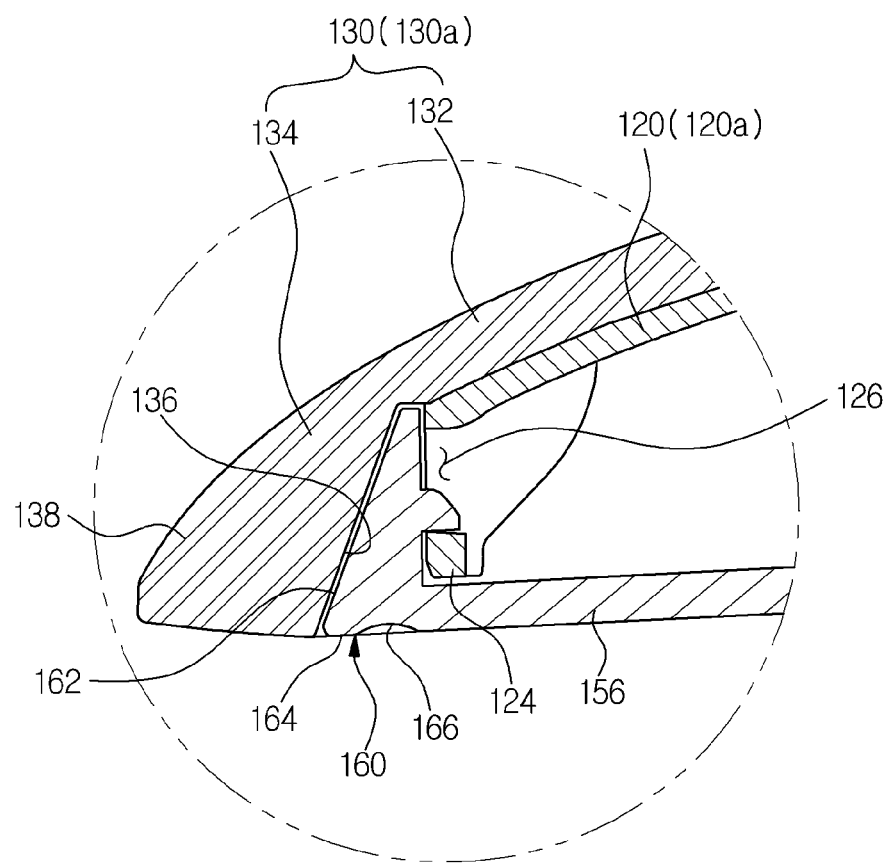
FIG. 8 is a view illustrating section B of the door of a washing machine shown in FIG. 6.

FIG. 7 is a view illustrating coupling of the parts of the door 100 of a washing machine in section B shown in FIG. 6, and FIG. 8 is a view illustrating section B of the door of a washing machine shown in FIG. 6.

The first upper door 120 may include a first part 122 adjoining the second upper door 130 and a second part 124 curved downward and extending from the periphery of the first part 122. The coupling groove 126 may form the second part 124 of the first upper door 120.

An insertion groove 140 may be formed between the second section 134 of the second upper door 130 and the second part 124 of the first upper door 120 to allow the inclined flange 160 to be inserted thereinto.

The inclined flange 160 may include the inclined part 162 and a contraction preventing part 166.

The inclined part 162 is inclined to correspond to the interior of the flange lower surface 164 and arranged to be exposed through the second section 134. The inclined part 162 may be formed along the outer edge of the inclined flange 160.

The inclined part 162 may be inclined to be directed from the upper portion of the lower door 150 to the lower portion of the lower door 150 with respect to the direction extending from the center of the lower door 150 to the outer edge of the lower door 150. In other words, the inclined part 162 may be curved from the flange lower surface 164, which will be described below, and form a certain angle with the flange lower surface 164 to face the second section 134.

The inclined part 162 may be provided to the interior of the second section 134 of the second upper door 130 to correspond to the inclined part 162. An inner inclined surface 136 may be inclined from the upper portion of the second upper door 130 toward the lower portion of the second upper door 130 with respect to the direction extending from the center of the upper door 110 toward the outer edge of the upper door 110 such that the inner inclined surface 136 corresponds to the inclined part 162. The inner inclined surface 136 is arranged to correspond to the inclined part 162, and the light traveling through the second section 134 is refracted or scattered and then reaches the inclined part 162, making the inclined part 162 present a metallic color.

The contraction preventing part 166 may be provided on a surface adjacent to the inclined part 162.

The contraction preventing part 166 is provided to the lower portion of the inclined flange 160 to prevent contracting deformation of the inclined part 162 when the lower door 150 is formed.

The inclined flange 160 may further include the flange lower surface 164. The flange lower surface 164 may be an orthogonal projection of the inclined part 162. The flange lower surface 164 is provided to the lower portion of the inclined flange 160 formed along the periphery of the inclined part 162. In another aspect, the flange lower surface 164 may be formed along the periphery of the lower door 150 and provided on the lower surface 156.

The contraction preventing part 166 may be provided on the flange lower surface 164. The contraction preventing part 166 may be formed to protrude or be recessed. In this embodiment, the contraction preventing part 166 may be recessed to ensure smooth opening and closing of the door 100.

The contraction preventing part 166 may be recessed relative to the adjacent flange lower surface 164. The lower door 150 may be formed through injection molding separately from the upper door 110. The inclined flange 160 may have a thickness greater than that of the lower door body 152, and thus it may be contracted and distorted when it is cooled after being formed through injection molding. The contraction preventing part 166 is provided to prevent this problem. Through the configuration of the contraction preventing part 166, the thickness of the inclined flange 160 may be relatively reduced, and deformation of the inclined part 162 of the inclined flange 160 may be prevented.

In other words, the inclined flange 160 has a thickness greater than that of the lower door body 152, and the contraction preventing part 166 is provided to prevent contraction of the inclined flange 160 during injection molding by reducing the difference in thickness between the inclined flange 160 and the lower door body 152.

The inclined part 162 and the flange lower surface 164 are disposed with an edge of the lower door 150 placed therebetween. The inclined part 162 and the flange lower surface 164 are spaced apart from each other such that an acute angle is formed between the inclined part 162 and the flange lower surface 164.

That is, if an angle between the inclined part 162 and the flange lower surface 164 is defined as $\alpha$, $\alpha$ is between 0 degrees and 90 degrees in this embodiment. Specifically, $\alpha$ may be 67 degrees. However, $\alpha$ is not limited thereto. Any angle allowing the inclined part 162 to present a metallic color when exposed through the second section 134 may be adopted.

According to one embodiment of the present invention, the second section 134 is formed of a transparent material and the inner inclined surface 136 is provided inside the second section 134. Accordingly, light traveling through the second section 134 may have different indices of refraction. Accordingly, different indices of refraction and scattering of light in the second section 134 and exposure of the inclined part 162 of the lower door 150 through the second section 134 produce a metallic color. That is, the inner inclined surface 136 of the second section 134 and the inclined part 162 of the lower door 150 present a metallic color.

According to one embodiment of the present invention, when the washing machine is externally seen by a consumer, the boundary between the upper door 110 and the lower door 150 present a metallic color. Accordingly, a decorative factor may be added to the door 100 even without separately performing a post processing such as metal plating or boding.

Through the simple manufacturing process as above, an effect related to design may be obtained and manufacturing costs may be reduced.

The first upper door 120 may be referred to as an inner upper door 120a, and the second upper door 130 may be referred as to an outer upper door 130a.

Hereinafter, a description will be given of a method of manufacturing a door of a washing machine according to one embodiment of the present invention.

The upper door 110 has the first section 132 and the second section 134 formed around the first section 132. The door 100 may include an outer upper door 130a formed of a transparent material allowing incident light to be transmitted therethrough and a inner upper door 120a disposed inside the first section 132 of the outer upper door 130a and having at least one portion seen through the outer upper door 130a. The outer upper door 130a and the inner upper door 120a may be formed through double injection molding.

The outer upper door 130a may be formed first through injection molding, and then the inner upper door 120a may be formed secondarily through injection molding. Alternatively, the inner upper door 120a may be formed first through injection molding, and then the outer upper door 130a may be formed secondarily through injection molding.

The second upper door 130 may be provided with the inner inclined surface 136 arranged inside the second section 134 and inclined downward from the upper portion of the outer upper door 130a with respect to the direction extending from the center of the outer upper door 130a toward the outer edge of the outer upper door 130a such that the inner inclined surface 136 corresponds to the inclined part 162.

The lower door 150 includes the inclined part 162 arranged along the periphery of the lower door 150 and formed at a certain angle with respect to the lower door 150 and a contraction preventing part 166 provided to the lower portion of the inclined part 162 to maintain the inclined surface of the inclined part 162. The lower door 150 may be formed through injection molding separately from the upper door 110.

In addition, lower surface 156 defining the shape of the lower portion of the door 100 may be formed at the lower door 150, and the flange lower surface 164 defining the orthogonal projection of the inclined part 162 may be formed on the lower surface 156. In addition, the contraction preventing part 166 may be formed on the flange lower surface 164.

The door 100 is manufactured by coupling the lower door 150 to the upper door 110 such that the inclined part 162 corresponds to the interior of the second section 134 of the upper door 110.

As is apparent from the above description, a washing machine and a manufacturing method of a door according to embodiments of the present invention may obtain an aesthetic effect of the door without performing a post-processing operation. Thereby, manufacturing costs may be reduced, and eco-friendly and elegant design may be implemented. In addition, contraction of the door may be prevented during the manufacturing process, and therefore manufacturing efficiency may be enhanced.

Although a few embodiments of the present invention have been shown and described, it would be appreciated by those skilled in the art that changes may be made to the embodiments without departing from the principles and spirit of the invention, the scope of which is defined in the claims and their equivalents.

What is claimed is:

1. A washing machine comprising:
   a cabinet forming an external appearance of the washing machine and having an opening;
   a tub provided in the cabinet to store wash water;
   a rotary tub rotatably provided in the tub; and
   a door to open and close the opening,
   wherein the door comprises:
   an upper door including a first upper door having a portion that is non-light transmissive and a second upper door coupled to an upper surface of the first upper door; and
   a lower door coupled to the upper door,
   wherein the first upper door is disposed between the second upper door and the lower door, and the second upper door comprises a first portion contacting the first upper door such that the first upper door is visible through the first portion and a second portion contacting the lower door such that the lower door is visible through the second portion.

2. The washing machine according to claim 1, wherein the lower door includes an inclined part contacting the second portion of the second upper door.

3. The washing machine according to claim 2, wherein a lower surface of the lower door is provided with a recess extending along the inclined part.

4. The washing machine according to claim 2, wherein the inclined part can be seen through the second portion of the second upper door.

5. The washing machine according to claim 2, wherein the inclined part is inclined downward from an upper portion of the lower door with respect to a direction extending from a center of the lower door toward an outer edge of the lower door.

6. The washing machine according to claim 1, wherein the first upper door is a colored opaque material.

7. The washing machine according to claim 1, wherein the second upper door is formed of a transparent material.

8. The washing machine according to claim 3, wherein the inclined part forms an acute angle with the lower surface of the lower door.

9. The washing machine according to claim 8, wherein the acute angle is about 67 degrees.

10. The washing machine according to claim 1, wherein the first upper door is integrated with the second upper door.

11. A washing machine comprising:
    a cabinet forming an external appearance of the washing machine and having an opening;
    a tub provided in the cabinet to store wash water;
    a rotary tub provided in the tub to accommodate laundry; and
    a door to open and close the opening,
    wherein the door comprises:
    an upper door including a first upper door, and a second upper door arranged on the first upper door and integrated with the first upper door; and
    a lower door coupled to the upper door,
    wherein the first upper door is disposed between the second upper door and the lower door, and wherein the door has a first portion so that the first upper door is visible through the second upper door and a separate second portion so that the lower door is visible through the second upper door.

12. The washing machine according to claim 11, wherein the lower door comprises a contraction preventing part recessed from a lower surface of the lower door.

\* \* \* \* \*